United States Patent Office 3,580,894
Patented May 25, 1971

3,580,894
UNIQUE POLYMERS AND PROCESSES FOR
PRODUCING SAME
Gerd M. Lenke, Dover, Del., assignor to Standard Brands
Chemical Industries, Inc., Dover, Del.
No Drawing. Filed Jan. 30, 1968, Ser. No. 701,556
Int. Cl. C08f 27/06
U.S. Cl. 260—79.5                                                      16 Claims

ABSTRACT OF THE DISCLOSURE

A unique class of phosphorus and sulfur-containing polymers comprising the reaction products of an unsaturated polymer and a hydrocarbyl phosphinodithioic acid and the processes for making them. These polymers are self-curing and many have superior adhesive properties.

---

This invention relates to a novel class of polymers containing sulfur and phosphorus and to processes for preparing these polymers. In particular, this invention relates to polymeric addition products prepared by reacting unsaturated polymers with selected sulfur- and phosphorus-containing organic compounds and the processes for effecting such reactions.

Depending upon their intended use, the polymers of the invention may be made to exhibit elastomeric properties or, if desired, they may also be made to exhibit more resin-like properties. The properties of most polymers are usually determined during the polymerization reaction and/or during compounding after polymerization to exhibit certain additional properties such as increased oxidation and heat stability, increased oil resistance, decreased solubility in non-polar solvents, improved antistatic properties, and improved tack and adhesion to polar substances such as metals, paper, textiles and the like, as well as to other polymeric materials. In preparing conventional elastomeric polymers, for example, these and other desired properties may be obtained by the addition of specific functional groups to the polymer backbone, such as by copolymerization, followed by a curing treatment, that is, vulcanization. It is, however, often necessary to use stabilizers, anti-oxidants and other such auxiliary additives to ensure that the polymer product exhibits the desired properties. This is particularly true in the case of highly unsaturated hydrocarbon polymers such as polymers of butadiene and substituted butadienes, e.g. isoprene and chloroprene.

Advantageously, this invention produces polymeric addition products, i.e., adducts, from unsaturated polymeric materials in such a manner that the degree of unsaturation is reduced. By controlling this reduction, many of the abovementioned desirable properties, e.g. resistance to oxidants, such as oxygen and ozone, are improved. Therefore, the polymers of this invention need less or no auxiliary polymer additives. In addition, the resistance of these polymers to non-polar solvents, e.g. naphthas, gasoline, lubricating oils and the like, is increased.

Thus, this invention contemplates a variety of new polymers which are adducts prepared by effecting reaction of a polymer containing ethylenic type unsaturation that may or may not have additional functional groups, with a phosphinodithioic acid.

More particularly, in accordance with this invention, polymeric adducts having improved properties such as stability to oxidation, solvent resistance, adhesion and self curability, are prepared by reacting selected proportions of an unsaturated diene rubber with diphenylphosphinodithioic acid to reduce the degree of unsaturation of the rubber and to add a sulfur- and phosphorus-containing functionality to the polymer, whereby said improved properties are obtained. Advantageously, the reaction may be effected in a polar or non-polar liquid medium or in bulk (i.e. without diluent) with or without the addition of a catalyst.

The polymeric material having unsaturation, which may be used to prepare the polymeric adducts of the invention, are not limited to any particular method of preparation. For example, the unsaturation in the base polymer may be introduced either by choice of monomers or by subsequent reactions of the polymer to yield unsaturation.

Preferably, the base polymeric materials are a variety of diene homopolymers and copolymers having varying degrees of unsaturation. These polymers may be in the form of liquids, solids or in liquid dispersions thereof. They may be synthetic or natural-occurring polymers such as hevea rubber, balata, or guttapercha. Among the synthetic homopolymers are the diene rubbers such as polybutadiene and polyisoprene (these include those with 1,4-cis, trans, and vinyl double bonds and those with the all 1,4-cis bonds) and polychloroprene.

Among the copolymers particularly suitable for use in this invention are those prepared from monomeric materials at least predominantly comprising one or more aliphatic conjugated dienes and, preferably, one or more ethylenically unsaturated monomers copolymerizable with the diene. As used herein, the term "ethylenically unsaturated monomers" includes copolymerizable monoolefinic monomers and is to be construed as excluding conjugated dienes, but may include other polyolefinic monomers.

The monomeric aliphatic conjugated and non-conjugated dienes suitable for use include the butadiene-1,3 hydrocarbons such as butadiene - 1,3 itself; 2 - methyl butadiene - 1,3 (isoprene); 2,3 - dimethyl butadiene-1,3; piperylene; 2-neopentyl butadiene-1,3; and other hydrocarbon homologs of butadiene-1,3. In addition, the substituted dienes, such as 2-chloro butadiene-1,3; 2-cyano butadiene-1,3; the straight chain pentadienes; the straight chain and branch chain hexadienes, mono- and polycyclic dienes, such as cyclopentadiene and the like, are found suitable. In general, dienes containing more than 10 carbon atoms polymerize very slowly, if at all, in the present polymerization systems; consequently, it is preferred to employ a diene having ten carbon atoms or less. Dienes having from 4 to 6 carbon atoms have particularly advantageous reaction rates and polymerization characteristics and, therefore, are preferred. The butadiene-1,3 hydrocarbons, and butadiene-1,3, in particular, are preferred. Tri- and other poly-enes, e.g. cyclododecatriene, may also be used.

The monomeric materials to be polymerized may also contain one or more copolymerizable monoolefinic monomers. Such monoolefinic monomers are well known in the art and are indicated by typical monomers set forth below. They may be simple all hydrocarbon mono-olefins, e.g. ethylene, propylene, 1-butene, isobutylene, etc., having double bonds of relatively low polarity. On the other hand, monolefinic monomers may be used which contain a differently activated carbon-to-carbon bond, that is, a monomer having a more polarized carbon-to-carbon double bond, because of the presence of functional groups such as carboxylic acid, carboxylic ester, amide, nitrile, halogen, keto, ether and other such groups well known in the art as activating groups. Among the monoolefinic monomers copolymerizable with the dienes, and characterized by the presence of such groups are the carboxyl-containing monomers, e.g. monocarboxylic acids such as the acrylic acids, polycarboxylic acids and their anhydrides and partial esters such as fumaric, maleic and itaconic acids, maleic anhydrides and monomethyl itaconate; aliphatic unsaturated nitriles, such as the lower molecular weight nitriles, acrylonitrile, alpha-chloro acrylonitrile, methacrylonitrile, ethacrylonitrile; the low molecular weight alcohol esters of acrylic and substituted acrylic acids, such as methyl methacrylate, methyl acrylate, methyl ethacrylate, butyl methacrylate, isobutyl dichloro acrylate, and other acrylic esters of alcohols, preferably having from one to six carbon atoms; styrenes, such as styrene itself, halo, cyano, alkyl, aryl, and other substituted styrenes, for example vinyl toluene, alpha-methyl styrene, alpha-chloro styrene, p-cyano styrene, p-phenyl styrene; other polymerizable vinyl compounds, such as vinyl naphthalene, vinyl pyridine, vinyl ethers and ketones; and other compounds such as vinylidene chloride.

The diene homopolymers and copolymers used in the invention may be prepared in any conventional manner suitable for the production of polymeric materials. Bulk, solution, suspension, emulsion and other polymerization techniques may be employed.

A preferred method by which the polymers can be prepared is by polymerization in an aqueous medium containing an added emulsifier. Many emulsifying agents may be used in the polymerization of the diene polymers, including fatty acid soaps, the rosin and disproportionated rosin acid soaps, the sulfates and sulfonates, and others which are well known by those skilled in the art of polymerization. Also polymerization catalysts, such as peroxy compounds, and polymerization modifiers such as the primary, secondary and tertiary alkyl mercaptans containing from 4 to 16 carbon atoms, as well as other polymerization ingredients, may be utilized in the polymerization, as is well understood in the art of synthetic rubber preparation.

Other methods to synthesize polymers containing unsaturation, which methods yield polymers suitable for use in accordance with the invention, include the use of ionic or coordination type catalysts, for instance, anionic, cationic or Ziegler-type initiators. Examples of anionic catalysts are alkali or alkaline earth metals, complexes of these metals with aromatic hydrocarbons, alkali or alkaline earth metal alkyls, aryls and alkaryls. Examples of cationic catalysts are Lewis acids such as $AlCl_3$, $BF_3$, $SbCl_5$, $PF_5$, etc. Examples of coordination-type catalysts are combinations of aluminum alkyls and transition metal compounds or complexes of platinum group metals such as $RhCl_3 \cdot 3H_2O$.

In general, polymerizations are effected at temperatures ranging from as low as $-100°$ C. to about $100°$ C., the lower temperatures often being employed for ionic polymerizations.

In the preparation of the diene copolymers, particularly by emulsion techniques, the monomeric mixtures usually contain from about 20 percent by weight to about 90 percent by weight of the above enumerated dienes.

It will be understood that the polymeric materials suitable for purposes of this invention therefore include many kinds of unsaturated polymers, preferably those which have ethylenic type unsaturation, i.e. carbon-to-carbon double bonds, free of electro-withdrawing substituents such as the carboxyl, nitrile, sulfoxy and the like groups, attached to the carbon atoms forming the double bonds; the diene homopolymers and copolymers enumerated above being exemplary of the preferred polymers.

The organic sulfur- and phosphorus-containing compounds suitable for the purposes of this invention are compounds having two carbon atoms attached to the phosphorus. Preferably, these compounds are the aromatic phosphinodithioic acids which react with olefinic linkages, i.e., double bonds, within the polymer to produce thio esters that may upon hydrolysis form active sulfhydryl groups (—SH) in the polymers.

These organic sulfur- and phosphorus-containing compounds are represented by the following chemical formula:

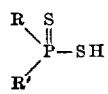

wherein R and R' are the same or different hydrocarbyl radicals bonded directly to the phosphorus by very strong carbon to phosphorus bonds and include unsubstituted and substituted paraffinic and aromatic hydrocarbyl radicals. Among the preferred unsubstituted aromatic hydrocarbyl radicals are the aryl groups such as phenyl, naphthyl, anthryl, phenanthryl, and the like. The substituents which may be attached to these aryl groups are the hydrocarbyl groups, e.g., alkyl, arylalkyl, cycloalkyl, aryl and the like, the halo groups, e.g., chloro, iodo, bromo, and fluoro; the aryloxy groups, e.g., oxyphenyl; and the thioaryloxy groups, e.g., thiophenyloxy and the like. Exemplary of the substituted aromatic radicals are tolyl, xylyl, cumyl, ethyl phenyl, isopropylphenyl, n-propyl phenyl, isobutyl phenyl, cyclohexyl phenyl, methylcyclohexyl phenyl, dodecyl phenyl, chloro-phenyl, dichlorophenyl, chloro-xenyl, chloro-naphthyl, ethyl-chloroanthracyl, bromo-phenyl and the like. In accordance with this invention the aromatic hydrocarbyl radicals containing 6 to 15 carbon atoms are preferred, particularly the phenyl group.

The paraffinic hydrocarbyl radicals include the unsubstituted radicals, e.g., alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like and the substituted radicals, e.g. halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl, and the like; the preferred contain 1–10 carbon atoms.

In accordance with this invention, the addition reactions between the unsaturated polymers and the hydrocarbyl phosphinodithioic acids may be effected over a wide range of reaction temperatures, i.e., from below room temperature to about $150°$ C., the faster rate of reaction being obtained at the elevated temperatures.

In general, the choice of the reaction temperature is dependent on the reactants, the nature of the reaction medium, and whether a catalyst is used. For example, it has been found that reaction of diphenylphosphinodithioic acid and a butadieneacrylonitrile rubber copolymer proceeds slowly at room temperature in a reaction medium such as toluene; whereas the rate of reaction between the acid and a copolymer of butadiene and acrylonitrile in the form of an aqueous latex is very rapid at room temperature. Similarly, the reaction in bulk of either 1,4-cis-polyisoprene or butadiene-acrylonitrile rubber proceeds faster than the reaction in solution of the corresponding reactants.

Usually the addition reaction between the unsaturated polymer and the phosphinodithioic acids is conducted for a sufficient period of time to effect the desired degree of addition of sulfur and phosphorus-containing functional groups thereto. The reaction time may vary from as short as about 10 minutes to as long as about ten days. Thus, the time for reaction depends upon reaction parameters such as the choice of reactants, the reaction environment and the degree of addition which is desired. It will be appreciated of course, that these parameters will also affect the nature of the polymeric adducts produced by the addition reaction.

Various amounts of the reactants may be employed. As a rule, the amount of phosphinodithioic acid reacted will be sufficient to provide a polymeric adduct which contains at least about 0.5 percent by weight and no more than about 95 percent by weight of the bound acid. Ofter an excess of the acid is used since it is difficult to saturate all of the double bonds of a particular unsaturated polymer. Moreover, it has been found that adducts having a high content of bound acid, e.g., about 60 percent and above, tend to lose some of their elastomeric properties. However, for other than typical elastomeric applications, these higher levels of bound acid are not objectionable. Generally, from about 0.5 to 500 parts by weight of the acid per 100 parts of unsaturated polymer is reacted with the unsaturated polymer.

Preferably, the adducts contain from about 1 percent to about 70 percent by weight of the bound acid. In terms of phosphorus and sulfur, this results in a phosphorus content ranging from about 0.05 to about 10 percent by weight and a sulfur content of from about 0.1 to about 30 percent by weight. In this regard it has been found that there is often a discrepancy between the S- and P-content of the polymer adducts.

From the standpoint of molar relationships, the polymeric adduct will contain at least about 0.5 to 100 mole percent of bound phosphinodithioic acid per double bond contained in the polymer.

Apparently, the phosphorus content of some of the adducts is lower than to be expected due to partial hydrolysis:

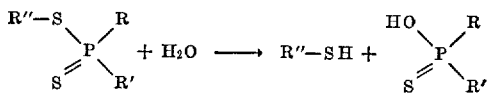

or similar reactions resulting in cleavage of the ester group. (R'' represents the polymeric chain, and R and R' are the hydrocarbyl radicals heretofore described.)

The addition reactions used to prepare the novel polymeric adducts of the invention may be carried out in an aqueous medium such as with a polymeric latex, in a solvent solution of the polymer or in bulk. Typical solvents include toluene, benzene, perchloroethylene, 1,1,2,2-tetrachloroethane and the like.

The reaction may be effected in the presence of air or under an inert atmosphere such as nitrogen gas.

Although the use of catalysts is not essential for purposes of this invention, it has been found that Lewis acids, such as AlCl$_3$ and SbCl$_3$, increase the reactivity of certain unsaturated polymers, particularly the diene homopolymers such as polybutadiene and polyisoprene. The amount of catalyst employed is usually small and may range from about 0.01 percent to about 5 percent by weight of the polymeric charge.

It is noteworthy to mention that the reaction can be carried out in the presence of (a) typical antioxidants, such as hindered phenols and alkylated aryl phosphites and or (b) typical free-radical polymerization inhibitors, such as di-tert.-butyl hydroquinone. This, and the fact that the addition is enhanced by Lewis acids, and that polyisoprene reacts easier and to a greater extent than a butadiene based polymer under comparable conditions, suggests strongly a cationic mechanism.

After completion of the addition reaction, the resulting polymeric products may be recovered from the reaction mixture by coagulation with a polar-type solvent such as isopropanol, methanol, ethanol, acetone, or the like. The product may be further extracted to remove excess acid. The product is then dried by conventional techniques. Subsequently, the product may be cured, i.e., vulcanized, in the manner well known in the art. In general, however, the severity of the cure required is less than that used with untreated polymers.

It has been found that the polymeric adducts of the invention are self-curing, i.e. they become crosslinked merely by application of heat and without the aid of vulcanizing agents. For example, a cis-1,4 polyisoprene adduct containing 5 percent bound diphenylphospinodithioic acid became totally insoluble in toluene upon heating for one hour at 350° F. whereas the base polymer, i.e., polyisoprene, became soft and remained completely soluble in toluene. This is particularly noteworthy in view of the fact that the base polymer above is not self-curing and may even be degraded by the application of heat. Though the phosphinodithionate group has no apparent cross-linking capability, nevertheless, because of the labile nature of the bond between phosphorus and the sulfur atom attached to the polymer molecule, as in shown by the hydrolyzibility of this bond and consequently the high relative sulfur content of some adducts, it apparently serves as a thermally activated curing site.

The adducts have a decreased degree of unsaturation compared with the starting polymers, corresponding with the ratio of thiophosphinic acid reacted over the amount of double bonds originally present. It is possible to saturate all double bonds and thus obtain polymers which have no carbon-to-carbon unsaturation in the main chain. When this is done, the resistance of the polymers against attack by ozone, oxygen and other oxidants is substantially improved. Advantageously, the resistance of the adducts against hydrocarbon fuels is also improved by the increased polarity from the phosphorus and the sulfur contained therein. The increased oxidation resistance of the adduct is also attributable to the sulfur introduced through the addition of the dithiophosphinic acid. Furthermore, the adducts show improvements in antistatic properties, fire resistance and tack over the original polymers.

The adduct products of this invention may vary considerably in their physical and chemical properties depending on the base polymer, the dithiophosphinic acid and the reaction parameters used. For example, in converting diene polymers to the phosphoros and sulfur-containing adducts it has been found that the resulting products include rubbers that are insoluble, tough and partially crosslinked during the addition reaction; rubbers that are soluble and soft; rubbers that are tough, highly elastic and snappy; and rubbers that are soluble, tacky and soft. These rubbers are self-curing by the application of heat and are millable before vulcanization.

Advantageously the products of this invention are useful as coating composition, e.g. in the preparation of films on rubber, metal or fibrous substrates, as adhesives, e.g. for preparation of laminates from Mylar, polyethylene, metal foils and the like; as curing agents for diene rubbers; and as a dry rubber for compounding, .e.g. for preparation of rubber articles having resistance to petroleum products such as oils, gasolines and the like.

The following specific examples further illustrate this invention:

EXAMPLE I

In a 500 ml. round-bottom flask, equipped with a stirrer, gas inlet, thermometer and reflux condenser, 20 grams of a 63/37 butadiene-acrylonitrile rubber (NBR) were dissolved in 180 grams of toluene, dry nitrogen gas passing slowly through the apparatus. Fifty grams of powdered diphenylphosphinodithioic acid (DPDA), i.e., 170 milliequivalents (meq.) of active acid, were charged to this solution to yield a light green liquid after dissolving. The temperature of the contents of the flask was raised to 100° C., whereupon the liquid became turbid and started to thicken.

After 6 hours at 100–110° C., the heating was discontinued, 100 milliliters of toluene were added and the mixture was allowed to cool down to room temperature. The reaction mixture separated into a solid phase and a clear liquid phase. The liquid top layer was mixed with a large excess of isopropanol which did not cause any coagulation of polymeric matter.

By titration it was found that the liquid contained 30 milliequivalents of acid. The remaining reaction product was extracted with toluene, washed with isopropanol and dried in a vacuum at 50° C., to yield 18.4 grams of an insoluble, tough polymer (product A). The toluene extracts contained 20 milliequivalents of acid. Some rubber material coagulated upon addition of isopropanol: 2.2 grams of a soluble rubber after drying (product C). Some other product was scorched to the walls of the reaction vessel which could be isolated only partially: 7.5 grams (product B). Total yield was 28 grams and 15 to 25 grams estimated losses. The fifty milliequivalents of DPDA from the liquid phase and from the extracts titrated back, thus indicate that about 120 milliequivalents of DPDA were added to the rubber (71 percent of the charge). The following analyses of the main products are in agreement with this calculation:

| | Percent S | Percent DPDA cald. | Percent P | Percent DPDA cald. |
|---|---|---|---|---|
| Product: | | | | |
| A (main prod.) | 16.10 | 63 | 6.92 | 56 |
| B | | Not analyzed | | |
| C | 10.96 | 43 | 5.28 | 43 |

While S- and P- content of product C indicate the same amount of DPDA built-in, this is not the case with product A. The low P-content apparent results from hydrolysis of the DPDA-NBR adduct. The free mercaptan groups and R—S radicals produced on the rubber backbone thus apparently cause crosslinking as is evidenced by the insolubility of product A in toluene, perchloroethylene and like solvents (in contrast, product C is soluble).

The S-content of the product A indicates that 55% of the original double bonds present in the polymer have been saturated, or on a weight basis, the DPDA adduct contains less than 17% unsaturation compared with the starting material.

EXAMPLE II

In a one liter reaction flask, equipped as described in Example I, a solution of 35 grams of the same type of butadiene-acrylonitrile rubber (NBR) in 315 grams of a toluene-tetra-hydrofuran mixture 2.5:1 was reacted with 88 grams of diphenylphosphinodithioic acid (DPDA) by stirring at room temperature under nitrogen gas for almost 2 days. During this time, the clear solution had become opaque and very viscous. A sample coagulated into isopropanol indicated a conversion of 53% of the DPDA, upon titration of the unreacted acid. After 48 hours from the start, the reaction product was coagulated from isopropanol and repeatedly extracted by stirring in fresh isopropanol. The dry weight of the sample taken (7.7 grams) indicated a total yield of 77 grams or a 48% conversion of DPDA. The total acid titrated in all extracts was 187 milliequivalents (45% of the DPDA apparently reacted).

After drying of the reaction product in vacuum at room temperature, the yield was 56.3 grams (+7.7 grams from the sample equals a total of 64 grams). The main product contains 12.4% S and 3.83% P.

EXAMPLE III

Using the apparatus described in Example I, a solution of 100 grams of the 63/37 butadiene-acrylonitrile rubber (NBR) in 900 grams of toluene was reacted with 200 grams of diphenylphosphinodithioic acid (DPDA) by heating to 100° C. and maintaining this temperature for about 2.5 hours. The reaction was carried out in air. After standing overnight a thick mass had formed. One gram of 2,5-ditert-butylhydroquinone (DBH) was added and the reaction product was isolated in the usual way to yield 144 grams of a light green, opaque rubber. The product was found insoluble in tetrahydrofuran, tetrahydrofuran-dichlorobenzene, dichlorobenzene, and tetrahydrofuran-dimethyl sulfoxide, but swells in all of these solvents. Analysis of the polymeric product showed that it contained 9.45% S and 2.8% P.

EXAMPLE IV

Example III was repeated at room temperature in the presence of air. After about 1 day, 1 gram of 2,5-ditertbutylhydroquinone (DBH) was added. Upon standing, a phase separation took place. The clear, liquid top layer was poured into isopropanol. Some soft, green rubber coagulated, it was washed and dried, to yield 5 grams of product. Then 165 milliequivalents of the acid were titrated in the supernatant. The other phase, a half-solid mass, was found predominantly soluble in dichlorobenzene at room temperature. One gram of DBH was added, and then the mass was coagulated into isopropanol. The soft, light green rubber was extracted with isopropanol and n-butanol to yield 120 grams after drying. The product was soluble in tetrahydrofuran. It contained 8.44% S and 1.03% P. The total diphenylphosphinodithionic acid (DPDA) titrated back was 291 milliequivalents or nearly 43% of the charge.

EXAMPLE V

Example IV was repeated with less diphenylphosphinodithioic acid (DPDA) and with a longer reaction time. Reaction of 100 grams of the diene copolymer rubber with 100 grams of the diene copolymer rubber with 100 grams of DPDA in toluene at room temperature for 8 hours and with 2 grams of 2,5-ditertbutylhydroquinone (DBH) standing overnight gave 124 grams of a dry product. This product was beige, tough snappy rubber, soluble in tetrahydrofuran and contained 5.06% S and 1.63% P.

EXAMPLE VI

This experiment shows that the addition reaction of this invention can be initiated in the presence of a free radical inhibitor such as 2,5-ditert-butylhydroquinone (DBH). One hundred grams of the nitrile rubber (NBR), used in the previous experiment, 100 grams of diphenylphosphinodithioic acid (DPDA) and two grams of DBH were dissolved in 900 grams of toluene and stirred for 5 hours at room temperature in an open vessel. The reaction product was isolated as in the previous examples. Yield: 135.5 grams of a light gray, opaque rubber, soluble in dichlorobenzene; 3.85% S and 2.09% P.

EXAMPLE VII

To 500 grams of latex of a copolymer of butadiene and acrylonitrile, BD:AN=63:37 by weight (170 grams solids), 150 grams of diphenylphosphinodithioic acid (DPDA) (powdered) was added with high speed agitation in an open beaker. After a short time, one liter of isopropanol was added to coagulate the reaction product and to dissolve the unreacted acid. The resulting solid was extracted repeatedly with isopropanol. A total of 345 milliequivalents of DPDA was titrated, indicating that 35% of the charge reacted. The yield of the dry rubber was 218 grams (almost completely soluble in tetrahydrofuran) and containing 4.72% S and 1.52% P.

EXAMPLE VIII

A solution of 100 grams of polybutadiene (a lithium polymerized butadiene, containing 1,4-cis, trans, and vinyl double bonds produced by Firestone Synthetic Rubber and Latex Co. and designated as Firestone Diene-55) in 795 grams of perchloroethylene was reacted with 200 grams of diphenylphosphinodithioic acid (DPDA) by heating to 80° C. and in the presence of a catalytic amount of AlCl$_3$ about 3 grams) and SbCl$_3$ 3 grams) for 6 to 7 hours. The reaction product was coagulated from isopropanol, extracted and dried to yield 157.5 grams of a dark green tough rubber. Subsequently, 153 grams of this product was recoagulated for further purification to yield 129 grams of a light green, opaque rubber. Upon analysis this rubber was found to contain 10.92% S and 2.68% P.

EXAMPLE IX

The reaction procedure outlined in Example VIII was modified as follows: 109 grams of the polybutadiene in 1.2 kilograms of perchloroethylene and 100 grams of diphenylphosphinodithioic acid (DPDA) were heated to 123° C. for 1.5 hours and kept at 100° C. for an additional hour. The reaction product isolated to yield 139 grams of a green, tough rubber. Titrations of the unreacted acid indicated a 57% conversion of the charged DPDA.

EXAMPLE X

One hundred grams of polyisoprene (a 1,4-cis-polyisoprene produced by Goodyear Tire and Rubber Co. and designated as Natsyn 400) were dissolved in 2 kilograms of perchloroethylene and heated to 85° C. in a reactor vessel. Then a solution of 200 grams of diphenylphosphinodithioic acid (DPDA) in 500 grams of perchloroethylene was added. The viscosity of the contents of the vessel increased rapidly. Even above 100° C. it was soon too thick to be stirred further. Heating was discontinued and the reaction mixture was allowed to stand for three days under dry nitrogen gas (all operations being under nitrogen gas). The mixture was treated with acetone to solidify the reaction product and to extract unreacted DPDA. A total of 366 milliequivalents acid were titrated, indicating that 35% of the charged DPDA had reacted. The yield was 153 grams of a gray-green, sticky and tough rubber. Based upon analyzed sulfur and phosphorus contents of 11.0 and 3.3% wt. respectively, only 53% of the original double bonds in the rubber remained.

EXAMPLE XI

The reaction of Example X was repeated using toluene as a diluent. One hundred grams of polyisoprene and 200 grams of diphenylphosphinodithioic acid (DPDA) dissolved in 1 kilogram of toluene was heated to 110° C. under dry nitrogen gas. Heat had to be turned off because the mixture became too thick for further agitation. The reaction mixture was allowed to stand under the nitrogen for 5 days. The resulting jelly-like product was treated with acetone. The solid polymer obtained, was extracted repeatedly with acetone and dried to yield 179 grams of a light beige, tough rubber. From the analyzed sulfur and phosphorus contents of 22.3 and 4.5% wt. respectively, it is computed that only about 13% of the double bonds remained in the base polymer.

EXAMPLE XII

Using the apparatus and general procedure outlined in the previous examples, 100 grams of polybutadiene (Firestone Diene 55) was dissolved in 1.7 kilograms of perchloroethylene and heated to 50° C. under dry nitrogen gas in a reaction vessel. Then 100 grams of diphenylphosphinodithioic acid were charged to the solution. The solution was heated to 121° C., and 4 milliliters of solvent stripped off to remove possible traces of water. After lowering the temperature to 100° C., 2.5 grams of $AlCl_3$ were added and the mixture was kept at 100° C. for one hour. The liquid became dark and more viscous. After standing overnight under dry nitrogen gas, the reaction product was coagulated with acetone. After extraction and drying the yield was 86.5 grams of an elastomer polymer and 37 grams of scorched material.

EXAMPLE XIII

A parallel experiment to Example XII with 1,1,2,2-tetrachloroethane as diluent instead of perchloroethylene was run to yield 136 grams of an almost white rubber. On the basis of this yield it appears that more than 26% of diphenylphosphinodithioic acid (DPDA) was incorporated into the polybutadiene.

EXAMPLE XIV

On a water cooled rubber mill was blended 100 grams of polyisoprene (Natsyn-500 from Goodyear Tire and Rubber Co.) and 5 grams of diphenylphosphinodithioic acid (DPDA). After 10 minutes an apparently homogeneous product was obtained. It was very tacky and soft. The product was dissolved in toluene at room temperature and thereafter coagulated again by addition of an excess of acetone. Both toluene and acetone are good solvents for DPDA. The coagulated polymer was separated from the supernatant. The polymer was rinsed with acetone. The supernatant was combined with the wash liquid and was titrated with 0.1 normal NaOH potentiometrically. 0.1 ml. of the NaOH was used to render the solution alkaline. Addition of water did not change the pH. This means that a maximum of 0.01 milliequivalent of the DPDA is unreacted. The charge was 5 grams of DPDA containing 15.4 milliequivalents acidic functionality, determined by titration of the acid. Thus the conversion was more than 99%, essentially quantitative.

The DPDA-polyisoprene adduct obtained was found to be much tackier than the original polyisoprene. It was found to adhere to many kinds of materials. Even polyethylene film was perfectly wetted by the adduct which spread over the film like a liquid. The adhesion appeared perfect to polyethylene, which because of its low surface free energy generally resists adhesion (adsorption theory of adhesion).

The DPDA-polyisoprene adduct also showed excellent adhesion to Mylar film (a polyester type) and proved to be self-curable. When samples of the DPDA-polyisoprene adduct were wrapped in Mylar film and heated in a rubber press to 300° F., 350° F. and 400° F. for one hour, the samples were perfectly crosslinked (insoluble in toluene) and showed excellent adhesion to the Mylar film. The film could not be mechanically separated from the rubber samples. A Natsyn-400 control treated the same way was found completely soluble in toluene and did not adhere to the Mylar film.

EXAMPLE XV

Example XIV was repeated using 200 grams of a 63/37 butadiene-nitrile rubber (NBR) and 10 grams diphenylphosphinodithioic acid (DPDA).

A sample of ther esulting elastomer product was extracted with acetone. 9.4 milliequivalents/100 grams product acid were extracted in 24 hours. The charge was 14.7 milliequivalents acid/100 grams product. This indicates a 36% conversion.

After storage of the main product for 8 days at room temperature it was found by extraction and titration that the conversion had increased to 59%.

The DPDA-NBR adduct proved to be curable by merely heating in the same fashion as described in Example XIV, in case of the polyisoprene-DPDA adduct. The cured samples again showed excellent adhesion to the Mylar film they were wrapped in.

EXAMPLE XVI

This is a repeat of Example VII using a solution of 150 grams diphenylphosphinodithioic acid (DPDA) in 200 ml. benzene instead of the solid DPDA. The solution was added to the latex at room temperature. No coagulation was observed. After 7 hours stirring at room temperature 1 liter distilled water was added to the latex. The resulting mixtures was stirred over night.

On the next morning, about 24 hours after the DPDA was charged to the latex, the original grayish-green color of the latex had changed to white. A vacuum was applied to the latex to strip off the benzene, some foaming being developed. After the foaming was largely reduced, isopropanol was added to the latex upon which a fine rubbery material coagulated. To assure that all benzene was removed the mixture was stirred in an open beaker, then the rubber was isolated by filtration, rinsing with isopropanol and drying. The dry product weighed 201 grams, contained 5.31% S and 0.8% P, and was soluble in tetrahydrofuran.

EXAMPLE XVII

To 39 grams of a liquid low molecular weight, butadiene-styrene copolymer (laboratory sample, emulsion polymerized; BD/ST=70/30), diluted with tetrahydrofuran (THF) was added a solution of 40 grams diphenylphosphinodithioic acid (DPDA) in THF. The total amount THF was 210 grams. After 90 grams of the THF were distilled off again. The remaining solution was refluxed under $N_2$ for 12 hours. After standing over night under $N_2$, the mixture was again refluxed for 9 hours. The product was allowed to stand approximately 60 hours.

A sample of the highly viscous material was titrated with NaOH, which indicated a 96% conversion of the DPDA.

EXAMPLE XVIII

This experiment is a repeat of Example XVII with only slightly different conditions: 56 grams of diphenylphosphinodithioic acid (DPDA) were charged to 50 grams of the liquid SBR (BD/ST=70/30) with 100 grams THF as mutal diluent. No THF was distilled off this time. The mixture was heated to reflux for 13 hours (75° C.) and allowed to stand at room temperature for 75 hours.

Thereafter a sample was analyzed (titration with NaOH) indicating a 94% conversion of the DPDA.

EXAMPLE XIX

A number of samples of the phosphorous- and sulfur-containing adducts produced by the procedures outlined in the preceding examples are cured or vulcanized by heating at temperatures of from 250° F. to 400° F. for periods of from one-half to two hours with and without additional curing aids. The vulcanised adducts are then evaluated by standard rubber testing methods to determine their physical performance properties, including ultimate tensile, ultimate elongation, Shore hardness, modulus and viscosity or degree of swelling in hydrocarbon and polar solvents. The results of these tests indicate that the diene polymer-diphenylphosphinodithioic acid (DPAD) adducts are elastomeric and when cured exhibit improved resistance to hydrocarbons such as lube oils, fuel oils, gasoline and kerosene. The partially insoluble tough adducts, as produced in Examples I to III are found useful for preparation of gaskets, hose, and rubber liners for use on oil tanks, etc. The more soluble opaque rubbers as produced in Examples IV to XIII and XVI are found useful as rubbery cements for cementing of gaskets and making of other cemented joints or laminates exposed to the above-enumerated hydrocarbons. The adducts each show superior resistance to attack after curing. The adhesive type adducts as produced by Example XIV are found especially useful for bonding plastic films such as Mylar, polyethylene and polypropylene.

EXAMPLE XX

In this example, the polyisoprene-diphenylphosphinodithioic acid (DPAD) adduct, as prepared in Example XIV, is dissolved in a toluene to produce a 50% solution. The adduct solution is applied to one side of a Mylar film. The coated side of the Mylar is then contacted with a sheet of uncured butadiene-styrene rubber having a sulfur-containing vulcanization aid and pressure is applied to cause the Mylar to adhere to the rubber sheet. The resulting Mylar-adduct-rubber laminate is placed in an oven and heated at a temperature of 300° F. for one-half hour to cure the adduct and rubber and also to permanently bond the Mylar to the rubber sheet.

It will be apparent that many widely different embodiments and that various changes in the processes of this invention may be made without departing from the spirit and scope thereof, and therefore the invention is not intended to be limited except as indicated in the appended claims.

What is claimed is:

1. A unique class of phosphorus- and sulfur-containing polymers comprising the reaction product of an ethylenically unsaturated polymer selected from the group consisting of synthetic and naturally occurring diene homopolymers and copolymers having a carbon-to-carbon double bonds that are free of electron-withdrawing substituents and an organic phosphinodithioic acid represented by the formula:

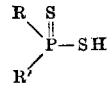

wherein R and R' are the same or different hydrocarbyl radicals selected from the group consisting of unsubstituted and substituted paraffinic and aromatic hydrocarbon radicals containing from 1 to 15 and from 6 to 20 carbon atoms, respectively, said unsubstituted aromatic hydrocarbon radicals being selected from the class consisting of phenyl, naphthyl, anthryl, and phenanthryl, and the substituted paraffinic and aromatic hydrocarbon radicals having substituents selected from the class consisting of alkyl, aryl, halo, alkyoxy, aryloxy and thioaryloxy groups, said phosphinodithioic acid being added cationically to the carbon-to-carbon double bonds of said unsaturated polymer to form phosphorus-sulfur-carbon linkages thereon.

2. The polymers of claim 1 which comprise adducts of a diene polymer and diphenylphosphinodithioic acid.

3. The polymers of claim 1, in which the degree of unsaturation of said unsaturated polymer is reduced to 1% of that possessed before the addition of said acid.

4. The polymers of claim 1, comprising from 0.5 to 95% by weight and preferably from 1 to 70% of bond acid.

5. The polymers of claim 1, in which the phosphorus content ranges from 0.05 to 10% by weight and the sulfur content ranges from 0.1 to 30% by weight based on the total weight of polymer.

6. Crosslinked polymers that are insoluble and infusible and which are produced by heating the polymers of claim 1 to a temperature of from 300° to 400° F. in the absence of a curing agent.

7. An adduct of an organic phosphinodithioic acid to an unsaturated polymer, the adduct obtained by the following general cationic reaction resulting in the following general reaction product:

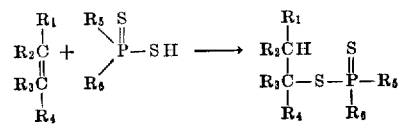

wherein $R_1$ and $R_4$ represent ends of the polymeric chain of an unsaturated polymer having carbon-to-carbon double bonds free of electron-withdrawing substituents, $R_2$ and $R_3$ are radicals selected from the group consisting of hydrogen, an alkyl group, and an aryl group; $R_5$ is a radical selected from the group consisting of an alkyl group and an aryl group; $R_6$ is a radical selected from the group consisting of an alkyl group and an aryl group different or the same as $R_5$; said alkyl groups containing from 1 to 10 carbon atoms and said aryl groups containing from 6 to 15 carbon atoms.

8. A process for producing unique phosphorus- and sulfur-containing polymeric adducts comprising the steps of effecting a cationic reaction between an unsaturated base polymer selected from the group consisting of synthetic and naturally occurring diene homopolymers and copolymers having carbon-to-carbon double bonds that are free of electron-withdrawing substituents and an organic phosphinodithioic acid represented by the formula:

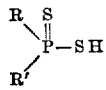

wherein R and R' are the same or different hydrocarbyl radicals selected from the group consisting of unsubstituted and substituted paraffinic and aromatic hydrocarbon radicals containing from 1 to 15 and from 6 to 20 carbon atoms, respectively, said unsubstituted aromatic hydrocarbon radicals being selected from the class consisting of phenyl, naphthyl, anthryl, and phenanthryl, and the substituted paraffinic and aromatic hydrocarbon radicals having substituents selected from the class consisting of alkyl, aryl, halo, alkyoxy, aryloxy and thioaryloxy groups, at a temperature of from about room temperature to about 150° C., from about 0.5 to 500 parts by weight of said acid cationically reacting with 100 parts of unsaturated base polymer at the carbon-to-carbon double bonds, controlling the reaction between the base polymer and the acid to form a unique cross-linkable polymeric adduct having phosphorus-sulfur-carbon linkages attached thereto, and thereafter recovering said unique cross-linkable polymeric adduct.

9. The process of claim 8 in which said reaction is effected as a bulk reaction.

10. The process of claim 8 in which said reaction is effected in an inert liquid reaction medium.

11. The process of claim 8, in which the polymer is present in latex form.

12. The process of claim 8, in which the base polymer is selected from the group consisting of elastomeric diene homopolymers and copolymers of dienes with mono-olefins.

13. The process of claim 8, in which the reaction is conducted in the presence of a Lewis acid catalyst.

14. The process of claim 8 in which the reaction is conducted in the presence of an antioxidant.

15. The process of claim 8 in which the reaction is conducted in the presence of a free radical polymerization inhibitor.

16. The polymers of claim 1 in which said diene polymer is a polyisoprene.

References Cited

UNITED STATES PATENTS

| | | | |
|---|---|---|---|
| 2,142,980 | 1/1939 | Huijser | 260—82 |
| 2,384,876 | 9/1945 | Bartram | 260—768 |
| 2,659,714 | 11/1953 | Harman | 260—78.5 |
| 2,957,931 | 10/1960 | Hamilton | 260—403 |
| 2,901,458 | 8/1959 | Banes | 260—45.5 |
| 3,030,264 | 4/1962 | Baker | 167—22 |
| 3,278,652 | 10/1966 | Barnas | 260—942 |
| 3,340,332 | 9/1967 | Oswald | 260—956 |

JOSEPH L. SCHOFER, Primary Examiner

C. A. HENDERSON, JR., Assistant Examiner

U.S. Cl. X.R.

117—133, 139, 140; 161—191, 213, 231, 247; 260—80, 80.71, 94.7, 978